Aug. 20, 1963

E. SCHASCHL ETAL 3,101,413

CORROSION TEST PROBE AND METHOD

Filed Nov. 16, 1959

INVENTORS
EDWARD SCHASCHL
BY ROBERT L. LITTLER

*Edward H. Lang*

ATTORNEY

United States Patent Office 3,101,413
Patented Aug. 20, 1963

3,101,413
CORROSION TEST PROBE AND METHOD
Edward Schaschl and Robert L. Littler, Crystal Lake, Ill., assignors to The Pure Oil Company, Chicago, Ill., a corporation of Ohio
Filed Nov. 16, 1959, Ser. No. 853,050
3 Claims. (Cl. 250—106)

This invention relates to an apparatus and method for measuring the corrosivity of confined atmospheres wherein a radioactive isotope of the material under test is exposed to the atmosphere and changes in the intensity of radiation are correlated with loss of the material due to corrosion and/or erosion. One feature of this invention is to provide a corrosion-test probe comprising a support member having thereon an area of a radioactive isotope of the material under test, and means for measuring the changes in intensity of the radioactive emanations therefrom. Another feature of this invention is to provide a corrosion-test probe comprising a tubular support member having an outer surface or portion thereof comprising a thin film of a radioactive isotope of the material under test, and means within said support member to detect and/or record changes in intensity of the radioactive emanations from the thin film as it is corroded and/or eroded. Still another feature of the invention is to provide a corrosion-test method including the steps of exposing a corrodible radioactive test element to the corrosive atmosphere and detecting and/or recording changes in intensity of emanation as the test element is corroded and/or eroded as a measure of the rate thereof.

The test probe of this invention is adapted to be used with various base elements or supports for insertion of the test probe into pressure vessels or conduits confining a corrosive atmosphere. The test probe and method of this invention has the advantage of utilizing conventional radiation-measuring equipment whereby extreme accuracy is made possible and the test results are directly correlated with actual corrosion and/or erosion conditions. In addition, the test probe and method of this invention offer the advantage of rapidity of measurement of corrosion along with reproducibility of results.

Accordingly, it becomes a primary object of this invention to provide an apparatus and method for measuring the corrosivity of confined atmospheres.

Another object of the invention is to provide an apparatus and method for corrosion measurement wherein a radioactive isotope sample or test element of the material under test is exposed to the corrosive atmosphere and changes in the intensity of radiation are correlated with loss of the material due to corrosion and/or erosion.

Another object of the invention is to provide a corrosion-test probe comprising a support member having thereon an area of a radioactive material, and means for measuring the changes in intensity of the radioactive emanations therefrom.

Another object of this invention is to provide a corrosion test probe comprising a tubular member having an outer surface or portion thereof comprising a thin film of a radioactive isotope of the material under test, and means within said tubular member to detect and/or record changes in intensity of the radioactive emanations from the thin film as same is corroded and/or eroded.

Still a further object of the invention is to provide a method and apparatus for determining the rate of corrosion of a metallic material of construction employing a radioactive isotope of the metallic material of construction as an indicator of such rate of corrosion.

These and other objects of the invention will be described or become apparent as the specification proceeds.

The invention is best illustrated by reference to the drawings wherein.

Figure 1:
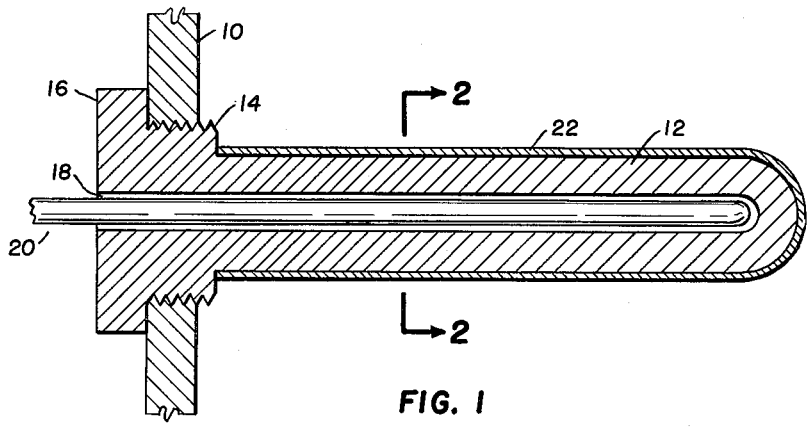
FIGURE 1 is a cross-sectional view of one form of test probe illustrating the invention.
Figure 2:
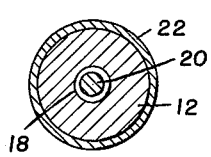
FIGURE 2 is a cross-sectional view taken along lines 2—2 of FIGURE 1.

Referring to FIGURE 1, the wall confining the corrosive atmosphere is represented by the number 10. Support member 12, having threaded section 14 and flange 16, extends through wall 10. Support member 12 has a centrally-located opening 18 extending along the length to form an enclosure in which the radiation-detecting means 20 is located. A relatively thin, uniform film or coating 22 of radioactive isotope of the material under study is shown encompassing the outer surface of support member 12. Film or coating 22 may cover a part or all of the protruding and otherwise exposed portion of the support member. FIGURE 2 shows the relationship of the coating 22, the support member 12 and the detecting means 20 within aperture 18.

Figure 3:
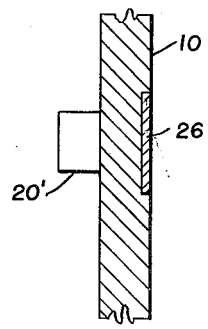
FIGURE 3 is a cross-sectional view of a simplified form of the invention.

In FIGURE 3, wall member 10 is shown with a coupon 26 of radioactive isotope of the material to be tested embedded in the exposed side thereof. The radiation-detecting means 20' is shown in such a position as to receive, detect, measure and/or record the intensity of radiation from the coupon 26.

Figure 4:
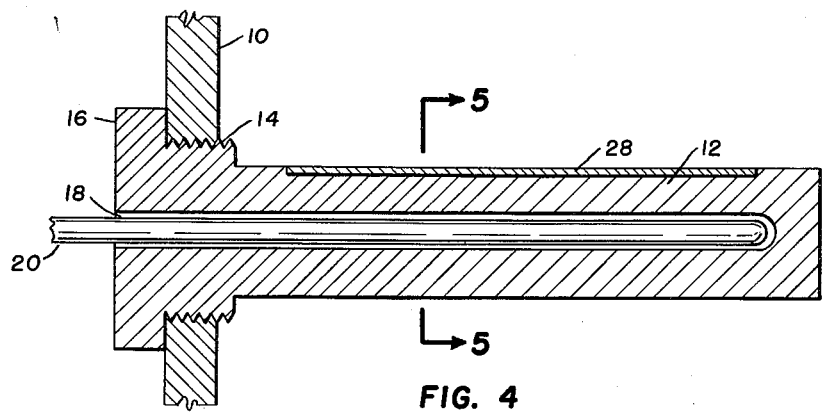
FIGURE 4 is a cross-sectional view illustrating a modified version of the embodiment shown in FIGURE 1.
Figure 5:
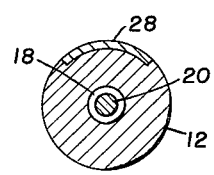
FIGURE 5 is a cross-sectional view taken along lines 5—5 of FIGURE 4.

Referring to FIGURES 4 and 5, an arrangement similar to FIGURE 1 is shown with corresponding parts except that thin film or coating 22 is changed to a coupon 28 imbedded in the support 12. This embodiment illustrates a test probe that is adapted to be used where the position of the test coupon in relation to the movement of the corrosive atmosphere is studied as a factor in determining whether the loss of metal is due to corrosion or erosion. Thus, with coupon 28 positioned on a side toward the direction of movement of the corrosive medium, the loss in metal due to both corrosion and erosion can be determined. By reversing the position of an identical probe, that is, with coupon 28 on the downstream side of support 12, and comparing the results, a determination by difference will account for both types of corrosion and the extent of each. In this instance, support 12 may be flat at the area holding coupon 28 to attain direct impingement of the moving corrosion medium, or support 12 may be rounded at this area to provide tangential impingement.

The materials of construction which may be studied by means of the method and apparatus of this invention comprise any material which exists in radioactive isotope form. Radioactive materials emit radiations of three primary types, namely, alpha particles, beta particles and gamma rays. Alpha particles are identical to helium nuclei and are usually emitted from radioactive isotopes of the heavier elements. Alpha particles possess very little penetrating power but produce intense ionization along their paths.

Beta particles are negative electrons which are emitted from a variety of radioisotopes. Beta particles exhibit greater penetration and lower ionization intensity than alpha particles.

Gamma rays are electromagnetic rays similar to X-rays, but having, however, a higher energy level. Gamma rays exhibit much greater penetration and lower ionization intensity than beta particles.

The choice of a beta-, beta-gama-, or gamma-emitting isotope as a material of construction for which information regarding the rate of corrosion would be of interest, is largely dependent upon the type of corrosion problem encountered, the nature of the measurements to be made and the available instrumentation. In accordance with this invention, a system of measurement is preferred and contemplated which requires the least concentration of radioactive material, and at the same time utilizes readily obtained or modified detecting and measuring equipment. The final selection of a specific isotope is governed by its utility as a material of construction, its half-life, possible biological hazards, physical and chemical stability and availability in usable form.

Alpha emitters are, as a whole, considered to be extremely hazardous and are available in very limited quantities. Also, alpha emitters present practical problems in measurement because of their very limited penetration, and the absence of physical properties making them utilizable as materials of construction. Accordingly, alpha emitters are not preferred as materials of construction in forming a thin film or coating 22, or the coupons 26 and 28 of the apparatus as disclosed.

However, regarding beta and gamma emitters, the recent developments in atomic enegy research and industrial or university laboratories have shown that these radioisotopes can be handled safely. Adequate protection for the worker from harmful radiation exposure in handling these materials can be had by following a few simple precautions. Simple monitoring procedures and devices, such as pocket dosimeters and film badges, are employed to assuure that radiation exposures are within the limits recommended by the National Committee on Radiation Protection, which is sponsored by The National Bureau of Standards.

Accordingly, many radioisotopes are available for use as coupons or coatings corresponding to a material of construction which may be of interest in corrosion studies. A partial list includes, beta-emitters: bismuth-210, copper-59, zinc-69 and carbon-14; beta-gamma-emitters: aluminum-29, cadmium-115, molybdenum-99, antimony-122, iron-59, zirconium-95, tungsten-115, cobalt-60 and silver-111; gamma-emitters: chromium-51 and tin-113. The foregoing isotopes are available through the facilities of the Atomic Energy Commission for use in preparing coatings and coupons to be used in accordance with this invention.

In measuring the radioactivity of the coatings or coupon, conventional radiation equipment comprising Geiger-Mueller counters, scintillation counters, or the like, can be used. Various methods for measuring radioactivity and detecting and measuring equipment are comprehensively considered in such standard texts as:

Taylor: Measurement of Radioisotopes, Wiley (1951)
Korpf: Electron & Nuclear Counters, Van Nostrand (1946), and
Sharpe: Nuclear Radiation Detectors, Wiley (1955)

The probe of this invention can be used with various portable, battery-operated, Geiger-Mueller survey meters for measuring alpha, beta, and gamma radiation of low or medium intensities. Such instruments are available incorporating proven, reliable electronic circuits and are contained in weatherproof cases to insure dependable operation under all conditions. Several ranges of sensitivity to radiation are provided including radiation intensities of 0.2, 2.0 and 20 mr./hr. full scale, corresponding to 600, 6000, and 60,000 counts per minute. The health tolerance level (6.25 mr./hr. for a 48 hour week) is slightly under half scale on the 20 mr./hr. range. The time constants of these instruments are automatically changed to the fastest possible response time consistent with statistical fluctuations and special circuit design assures no zero drift. Portable instruments such as the count-rate meter Model 2612M and 2612P manufactured by Nuclear-Chicago Corporation, may be modified to serve as the detecting unit to be used in accordance with this invention.

The coating 22 of radioactive isotope of the metal material of construction may be applied by spraying, painting, or evaporation. The printed circuitry techniques that have been developed and which are presently being improved may be used to apply a coating of radioactive isotope to the probe. Such techniques include etched wiring, stamped wiring, painted wiring, plated wiring, embossed wiring, and metal powder or sprayed metal processes. Where the metal to be tested in the corrosive environment is Zn, Cr, Fe, Cd, Co, M, Sn, Pb, Cu or Al, coatings thereof may be placed upon the support 12 by electroplating by passage of a current through an electrolytic salt of the radioactive metal.

The embossed wiring technique comprises pressing a metal foil, either coated with thermal- and chemical-resistant adhesive or utilizing a separate sheet of adhesive, into the surface of the insulating support 12 in apropriate strips or patches, or as an entire coating by means of a raised and heated die. The excess foil and adhesive is milled off the core or support, leaving a flush metal coating or strip or patch of the radioactive test metal composition. This method has the advantage of imbedding the test element or surface in the surface of the support 12 so that it is protected from mechanical shock and there are no areas where electrolytic or galvanic corrosion can occur. Also, where a patch or coupon of the radioactive test element is used, as shown in FIGURES 3, 4 and 5, they may be applied in grooves or recesses in the support 12 or conduit body 10 in the form of a powder, followed by the application of heat to sinter the metal powder into a continuous metal strip. The test elements or coupons or coatings may be applied by spraying molten metal thereon or into sunken grooves or through a suitable mesh to form the proper shape, thickness and size desired.

An example of a preferred technique for applying a coating of a radioactive material to test probes comprises the use of the evaporative procedure. In this process several support means of the desired shape are suspended in a bell jar containing a sample of radioactive material, alloy or metal composition. The bell jar is evacuated to a high vacuum and heat is applied to the sample of radioactive material. The heat causes the radioactive material to evaporate and slowly a coating thereof is built up on the support means. The amount of sample evaporated is adjusted to the size and area of the support means so as to form a thin layer thereon. By this method a satisfactory probe can be fabricated with little cost. The layer of radioactive coating or the thickness of the coupon thereof used in accordance with this invention will vary in accordance with the type of material of construction under study and the type or types of corrosive atmospheres to be encountered. In general, coatings or coupons having a thickness of about 0.0001 to 0.01 inch are satisfactory for most corrosion studies. Coatings of lesser thickness, even as small as 0.00001 inch may be used where radioactive samples available are expensive or the corrosion rates are slow. Greater thickness in the order of 0.1 to 0.2 inch may be used to study more active corrosion conditions. Also, the mass of radioactive coupon or coating is adjusted to limits such that the capacity or sensitivity of available detecting or monitoring units is met.

The foregoing techniques allow the coating 22, or coupons 26 and 28, to be formed in a composition which exactly corresponds to the metallic material of construction under consideration. Thus, steel containing 99% Fe and 1% C can be duplicated as a coating containing 99% Fe-59 and 1% C-14. Ferro-aluminum can be duplicated by the use of 80% Fe-59 and 20% Al-29; or commercial bronze by 90% Cu-59 and 10% Zn-69, or Dowmetal E by the use of 93.8% Mg, 6% Al-29 and 0.2% Mn. Similarly, a Chromax casting alloy can be prepared using 50% Fe-59, 35% Ni, 5% Si and 0.25% C wherein only one of the elements is a radioactive isotope.

The support 12 may be made of metal, i.e., it may be constructed of the metallic material of construction under test, or support 12 may be a non-corrosive, insulating material. Where the maximum operating temperature of the probe does not exceed about 250° F., support 12 may be made of paper and fabric laminates used in printed circuitry, such as XXPhenolic, XXPPhenolic, XXXPhenolic, XXXPPhenolic and epoxy resin laminates. These materials, described in Materials and Methods, vol. 42, No. 1, July 1955, exhibit good metal bonding strength, flexing strength and arc resistance, and are of low cost. The maximum temperature at which these laminates may be joined is about 400 to 450° F. with a time of heating of not more than about 5 seconds. Where glass fiber laminates are used for the support, the maximum operating temperatures are: melamine, 260° F.; silicone, 300° F.; polystyrene, 170° F.; polyester 250° F.; Teflon, 300° F.+; and epoxy 250° F.+, but the binding temperatures are higher and the dimension stability is improved over paper and fabric laminates. Phenolic nylon fabric laminates have only limited application since their maximum operating temperature during fabrication or use is only about 165° F. Ceramic insulators such as titanite, steatite, and glass-bonded mica withstand high temperatures. The latter-named mica inorganic materials can be fabricated or used at temperatures as high as 650° to 750° F.

In fabricating the test probes of this invention, care should be taken not to have dissimilar metals or materials that are exposed to the corrosive environment, one of which is the metal surface or material under test, in order to avoid galvanic effects which lead to errors in the corrosion rate determinations. In the preferred embodiment shown in FIGURES 1 and 2, the support 12 is composed of a non-conductor and the coating of radioactive isotope of the material of construction under consideration covers all or substantially all of the exterior surface thereof. This arrangement completely eliminates galvanic effects. Small galvanic errors in the embodiment shown in FIGURE 3 are avoided by having the radioactive coupon or insert 26 of the same composition as the wall 10 of the conduit or vessel confining the corrosive atmosphere. Similarly, the coupon 28 is so positioned on the exterior surface of support 12 in FIGURE 4 that the non-conductive support 12 insulates coupon 28 from any nearby metal such as vessel or conduit wall 10.

The corrosive atmosphere may be liquid, gaseous or mixed phase, or may contain suspended solids as in a fluid cracking system as applied to hydrocarbons. The probe of this invention is applicable to the study of corrosion or erosion in any type of atmosphere which causes the disintegration of the confining vessel. Examples of corrosive or erosive atmospheres are acid solutions, brine solutions, drilling muds, alkaline solutions, acidic gases, ammonia, sulfur vapors, hydrogen sulfide, hydrochloric acid, hydrofluoric acid, air, moist air, steam, and powdered solids.

From the description it is apparent that the invention relates to a corrosion-test probe comprising a radioactive specimen of the material of construction on a support means adapted to maintain the specimen within the corrosive atmosphere with or without means for detecting and measuring the changes of intensity of radiation therefrom. The probe may be any desired shape or cross-section, although the generally tubular or cylindrical form shown is preferred because of the ease of fabrication and facility with which the coating of radioactive material can be applied. The shape and size of the exposed surface of radioactive material can be changed as desired to conform with various shapes and contours of pieces of apparatus for which corrosion studies are contemplated.

Corrosion per se is generally associated with ferrous materials of construction, although both corrosion, that is, chemical disintegration, and erosion, or mechanical disintegration, constitute problems with materials of construction containing iron. The device of this invention and the methods set forth herein apply to studies of both erosion and corrosion, i.e., both types of disintegration, particularly as found in connection with ferrous materials of construction. The term corrosion as used herein is intended to include both chemical and mechanical disintegration of materials of construction. Erosion occurs frequently with non-ferrous materials of construction such as glass, porcelain, rubber, Bakelite, plastics, resins and other non-metallic materials. The device and method of this invention is adapted to be applicable to erosion studies as applied to non-metallic materials of construction.

Accordingly, the invention encompasses the use of a non-metallic material of construction, whether in the form of a sample, coupon or coating, in which is imbedded or dispersed a radioactive isotope for the purpose of acting as a tracer to follow the rate of erosion. This objective is met by uniformly incorporating a sufficient or a tracer amount, e.g., about 0.0001 to 0.01% of a radioactive isotope, in the non-metallic sample during fabrication, molding or compounding. Such an impregnated, radioactive, non-metallic composition is used to form, mold, or construct the desired coupon 26, coating 22, or foil strip 28 for use in the apparatus as described. The same technique in following the reduction in radioactive emanations would apply as described in connection with the metallic specimens, coupons, or coatings, e.g., with about 1.0% in radioactive form.

The invention is also seen to relate to a process of measuring corrosion rates wherein a radioactive sample or coupon of the metallic or non-metallic material of construction under study is exposed to a corrosive atmosphere and the intensity of radiation therefrom followed and/or recorded as a measure of the rate of corrosion. These and other features of the invention become apparent and are not limited by the examples given. The invention is also directed to a test device employing a sample, coupon, test element or coating of a material of construction which is corroded, eroded, or both, by an atmosphere, said sample, coupon, test element, or coating containing dispersed therein a radioactive isotope of an element with which a detecting device can be used to follow and/or record the change in radioactive emanations therefrom as the material of construction is corroded and/or eroded by the atmosphere.

The embodiments of the invention in which an exclusive property or privilege is claimed are defined as follows:

1. A corrosion-test probe comprising an elongated, hollow support means closed at one end, a radioactive coating of a corrodible material on the outer surface of said support means, and means within said hollow portion of said support means to detect the radioactive emanations from said corrodible material.

2. A corrosion-test probe comprising an elongated, hollow, non-conductive support means closed at one end, a radioactive coating of a corrodible metallic material on the outer surface of said support means and means within said hollow portion of said support means to detect the radioactive emanations from said coating.

3. A corrosion-test probe comprising an elongated, hollow, non-conducting support means, a radioactive coupon of a corrodible metallic material on the outer surface of said support means and means within said hollow portion to detect the radioactive emanations from said coupon.

References Cited in the file of this patent

UNITED STATES PATENTS

| | | |
|---|---|---|
| 1,991,934 | McCray | Feb. 19, 1935 |
| 2,660,678 | Sigworth et al. | Nov. 24, 1953 |
| 2,751,506 | Black et al. | June 19, 1956 |
| 2,809,306 | Coleman | Oct. 8, 1957 |
| 2,811,650 | Wagner | Oct. 29, 1957 |
| 2,867,727 | Welker et al. | Jan. 6, 1959 |
| 3,012,147 | Hermsen et al. | Dec. 5, 1961 |

OTHER REFERENCES

Bacon: Radioactive Tracers Used in Corrosion Studies, General Electric Review, May, 1949, pp. 7–9.

Review of Scientific Instruments, Liquid Level Switch, April 1957, page 300.